United States Patent
Princen et al.

(10) Patent No.: US 10,127,073 B2
(45) Date of Patent: *Nov. 13, 2018

(54) OPERATING SYSTEM CONTEXT SWITCHING

(71) Applicant: Acer Cloud Technology, Inc., Sunnyvale, CA (US)

(72) Inventors: John Princen, Cupertino, CA (US); Sandra Berndt, Cupertino, CA (US); Miao Cui, Los Altos, CA (US); Nigel Gamble, Mountain View, CA (US); Wilson Ho, San Mateo, CA (US)

(73) Assignee: Acer Cloud Technology, Inc., Sunnyvale, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/351,203

(22) Filed: Nov. 14, 2016

(65) Prior Publication Data

US 2017/0097846 A1    Apr. 6, 2017

Related U.S. Application Data

(63) Continuation of application No. 13/865,119, filed on Apr. 17, 2013, which is a continuation of application No. 12/784,382, filed on May 20, 2010, now Pat. No. 8,433,889.

(60) Provisional application No. 61/329,066, filed on Apr. 28, 2010.

(51) Int. Cl.
*G06F 9/46* (2006.01)
*G06F 15/177* (2006.01)
*G06F 9/455* (2018.01)
*G06F 9/4401* (2018.01)

(52) U.S. Cl.
CPC ............ *G06F 9/461* (2013.01); *G06F 9/4406* (2013.01); *G06F 9/45533* (2013.01); *Y02D 10/26* (2018.01); *Y02D 10/28* (2018.01)

(58) Field of Classification Search
CPC ............ G06F 9/44502; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 5,727,211 A | 3/1998 | Gulsen | |
| 7,409,536 B2 | 8/2008 | Guo et al. | |
| 2001/0018717 A1 | 8/2001 | Shimotono | |
| 2004/0205755 A1 | 10/2004 | Lescouet et al. | |
| 2007/0055860 A1 * | 3/2007 | Wang | G06F 1/3203 713/2 |
| 2007/0162901 A1 | 7/2007 | Oh | |
| 2007/0220246 A1 | 9/2007 | Powell et al. | |
| 2008/0092145 A1 | 4/2008 | Sun et al. | |
| 2008/0133903 A1 | 6/2008 | Sun et al. | |

(Continued)

*Primary Examiner* — Zahid Choudhury
(74) *Attorney, Agent, or Firm* — Sheppard, Mullin, Richter & Hampton LLP

(57) ABSTRACT

A technique for quickly switching between a first operating system (OS) and a second OS involves deactivating the first OS and loading the second OS from dynamic memory. The technique can include inserting a context switching layer between the first OS and a hardware layer to facilitate context switching. It may be desirable to allocate dynamic memory for the second OS and preserve state of the first OS before deactivating the first OS and loading the second OS from the dynamic memory.

21 Claims, 5 Drawing Sheets

(56) References Cited

U.S. PATENT DOCUMENTS

| | | |
|---|---|---|
| 2008/0244229 A1 | 10/2008 | Yao et al. |
| 2009/0249331 A1 | 10/2009 | Davis et al. |
| 2010/0185833 A1 | 7/2010 | Saito et al. |
| 2010/0241839 A1 | 9/2010 | Banga et al. |
| 2010/0306774 A1 | 12/2010 | Kalbarga |
| 2010/0325405 A1 | 12/2010 | Laue |
| 2011/0022832 A1 | 1/2011 | Motohama et al. |
| 2011/0107073 A1 | 5/2011 | Dalton et al. |

* cited by examiner

OPERATING SYSTEM CONTEXT SWITCHING

CROSS-REFERENCE TO RELATED APPLICATIONS

This application is a continuation of U.S. patent application Ser. No. 13/865,119, filed on Apr. 17, 2013, which is a continuation of U.S. patent application Ser. No. 12/784,382, filed on May 20, 2010, now U.S. Pat. No. 8,433,889, which claims priority to U.S. Provisional Patent Application No. 61/329,066, filed Apr. 28, 2010 which applications are incorporated by reference herein.

BACKGROUND

A computer is a programmable machine that receives input, stores and manipulates data, and provides output in a useful format. Computers can be found in a huge number of devices that could not realistically be exhaustively listed, including by way of example personal computers (PCs), smart phones, game consoles, web servers, personal data assistants (PDAs), automobiles, etc. Nearly all modern computers implement some form of stored-program architecture, which is the single trait by which computers are now defined.

In the 1960's libraries of common programs were stored on computers to increase efficiency when programs were run in succession. Eventually, computers were able to automatically switch between tasks, and runtime libraries were created to manage processing and printing speed. These and other features are now referred to as the operating system (OS). Common features for OSs include process management, interrupts, memory management, virtual file systems, device drivers, networking, security, and graphical user interfaces.

Computers that are capable of running multiple programs typically include an OS. The main purpose of the OS is to manage the way the programs use the hardware, and regulates the way that a user controls the computer. Some popular OSs for PCs include Microsoft Windows, Mac OS X, and Linux, but there are a great many others. The central component of most OSs is the kernel, which is a bridge between programs and data processing done at the hardware level. The kernel can provide the lowest-level abstraction layer for computer resources, especially processors and I/O devices, that programs need to perform their function.

It is possible to use multiple OSs on a single computer by changing the boot loader to allow a user to select the operating system they want to run at boot time. However rebooting is slow. It is also possible to use multiple OSs on a single computer by using virtualization to run multiple guest operating systems on top of a single host operating system. However, virtualization does not generally allow each OS direct access to hardware devices, which can reduce performance, particularly for programs that require direct access to high speed peripherals, such as games.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for quickly switching between a first operating system (OS) and a second OS involves deactivating the first OS and booting the second OS from memory. The technique can include inserting a context switching layer between the first OS and a hardware layer to facilitate context switching. The technique can include allocating memory for the second OS, which can include arranging memory contents to put the second OS in place. The technique can include preserving state of the first OS if it is desirable to switch back to the first OS at a later time.

In an embodiment, the context switching layer can include a hypervisor. A hypervisor normally presents a guest OS with a virtual platform and monitors the execution of the guest OS, which enables multiple OSs to share hardware resources. Advantageously, when the hypervisor is used in a context switching layer, the hypervisor can facilitate switching from the first OS to the second OS without necessarily requiring ongoing virtualization, which can result in improved performance. Advantageously, booting the second OS from memory can occur without rebooting through boot firmware, such as the basic input/output system (BIOS), extensible firmware interface (EFI), or other code that is run when a computer is powered on.

These and other advantages will become apparent to those skilled in the relevant art upon a reading of the following descriptions and a study of the several examples of the drawings.

BRIEF DESCRIPTION OF THE DRAWINGS

The following figures are intended to illustrate by way of example some aspects of techniques described in this paper.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
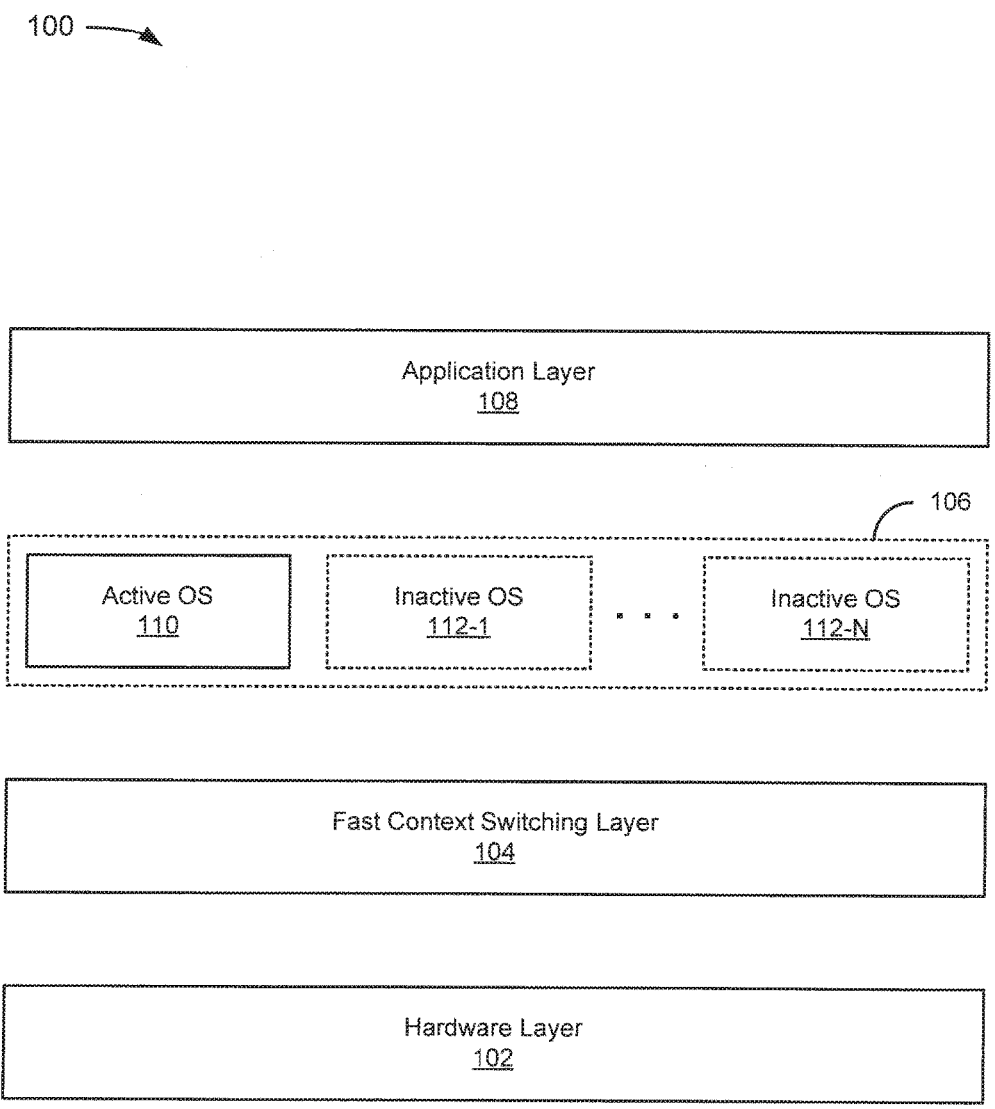
FIG. 1 depicts a conceptual diagram of operational layers of a fast context switching system.

FIG. 1 depicts a conceptual diagram 100 of operational layers of a fast context switching system. The diagram 100 includes a hardware layer 102, a fast context switching layer 104, an operating system (OS) layer 106, and an application layer 108.

In the example of FIG. 1, the hardware layer 102 is the bottom layer, upon which other layers are built. The hardware layer 102 includes a processor and can include other hardware components, such as additional processors and networking, graphics, and disk hardware. Conceptually, it is not important whether the hardware on which components of the other layers are implemented is part of the hardware layer 102, and this may or may not be the case for any given implementation. This is at least in part because, for example, programs at the application layer 108 can be implemented as software embodied in a computer-readable medium that includes hardware in a manner that is well-understood to those of skill in the relevant art. It should be noted that a person of skill in the relevant art would have no difficulty understanding what is meant by the term "computer-readable medium." To the extent legal interpretation introduces ambiguity, it should be understood that the intention in this paper is to encompass all statutory computer-readable media and to exclude nonstatutory interpretations of the term "computer-readable medium" to the extent it is necessary to preserve claim validity. Further, if the law changes, the term computer-readable medium should be interpreted consistent with the law of the time. Since the law is presumably unambiguous at any given time, such as today, the meaning of the term "computer-readable medium" is both clear to one of skill in the relevant art and not ambiguous to one with knowledge of the law since the definition encompasses only computer-readable media that is allowed under the law, no more and no less. "Computer readable storage medium" can also be used to refer to known or convenient statutory computer readable media, which are currently understood to exclude non-tangible media.

In the example of FIG. 1, the fast context switching layer 104 is conceptually located on top of the hardware layer 102. The other layers of the system 100 may or may not be agnostic with respect to the fast context switching layer 104. For example, an OS in the OS layer 106 may or may not be aware of the fast context switching layer interposed between the OS and the hardware layer 102. Thus, advantageously, fast context switching can be introduced into a system without changing applications, OS, or hardware. The fast context switching layer 104 includes components that enable fast switching between OSs using techniques that are described later.

In the example of FIG. 1, the OS layer 106 is conceptually located on top of the fast context switching layer 104. Typically, an OS is implemented as software embodied in a computer-readable medium, which can include firmware, hardware, or a combination thereof. The OS layer 106 includes an active OS 110 and inactive OS 112-1 to 112-N (collectively, the inactive OSs 112). The active OS 110 has at least occasional bare metal access to the hardware layer 102. This can be accomplished by requiring that the fast context switching layer 104 be inserted in a minimalist fashion using techniques that are described later. The OS layer 106 can swap between the active OS 110 and one of the inactive OSs 112 using fast context switching techniques described later. Advantageously, none of the OSs are treated as "guest" OSs that are forced to operate on top of a virtualization layer, such as a "thick" hypervisor. As used in this paper, "fast" context switching means that switching between OSs does not require a full reboot using boot firmware, such as BIOS, EFI, or other code. It should be noted that the OS layer 106 at a given time actually comprises only the active OS 110, since the inactive OSs 112 are not interposed between the fast context switching layer 104 and the application layer 108. This is different from, for example, a system that includes multiple guest OSs, which would be stacked on top of a master OS, and an application in the application layer 108 would, at least in some cases, have to pass through the guest OS and the master OS to reach hardware resources at the hardware level (of course, there would be no fast context switching layer).

In the example of FIG. 1, the application layer 108 is conceptually located on top of the OS layer 106. The OS layer 106 enables applications in the application layer 108 to make use of components of the hardware layer 102 that it needs to carry out its functionality. Typically, an application is implemented as software embodied in a computer-readable medium. Typically, an application can provide output and receive input through drivers in the OS to/from hardware in the hardware layer.

Figure 2:
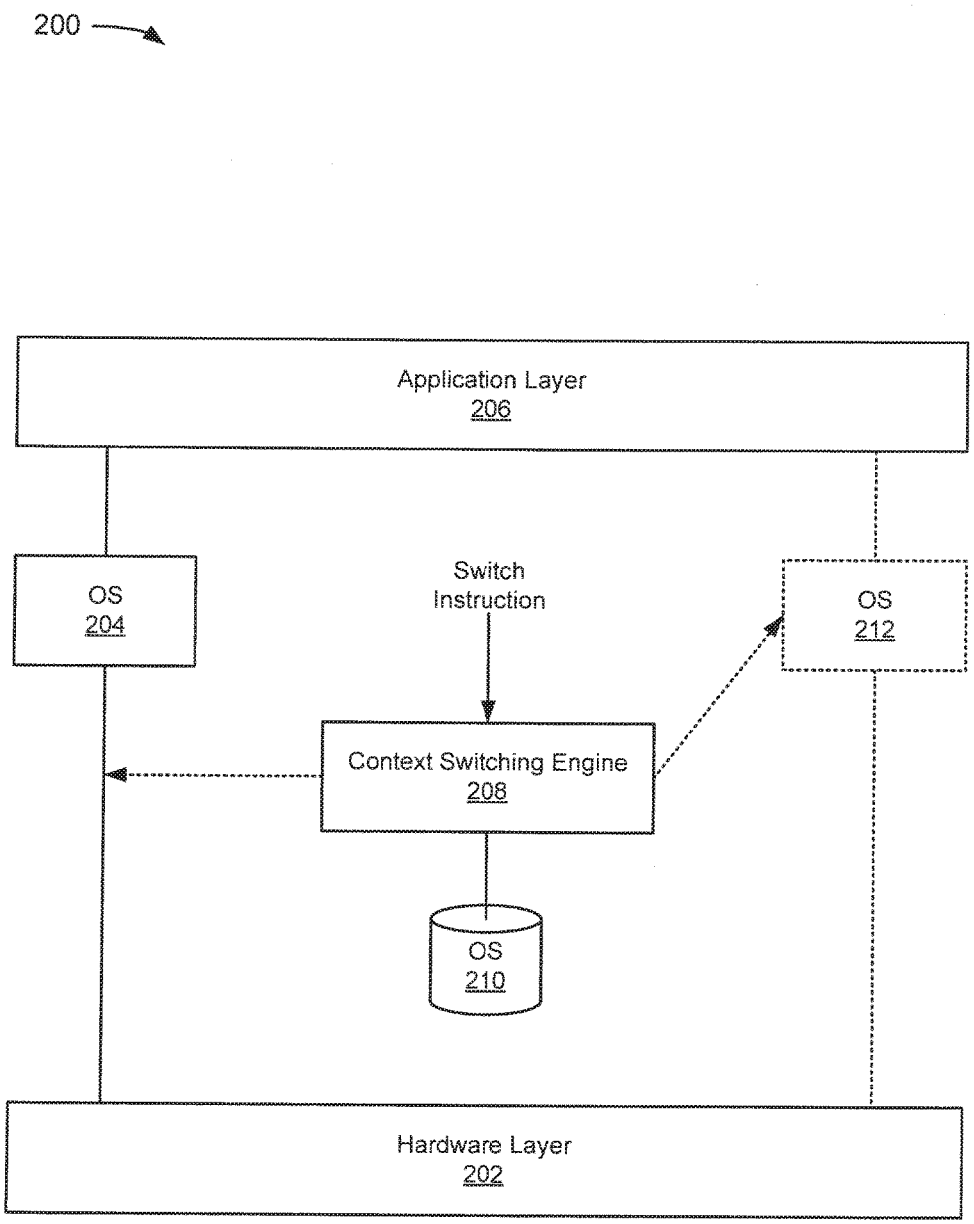
FIG. 2 depicts an example of a system capable of fast context switching.

FIG. 2 depicts an example of a system 200 capable of fast context switching. The system 200 includes hardware layer 202, OS 204, application layer 206, context switching engine 208, OS data store 210, and OS 212. The hardware layer 202, OS 204, and the application layer 206 are similar to the hardware layer 102, active OS 110, and application layer 108 described previously with reference to FIG. 1.

In the example of FIG. 2, the context switching engine 208 is conceptually located above the hardware layer 202 and below the OS 204, but does not necessarily lie between the hardware layer 202 and the OS 204 (at least not necessarily all of the time). As used in this paper, an engine includes a processor and memory including memory modules that can be executed by the processor. The context switching engine 208 can be implemented as software embodied in a computer-readable medium in the OS 204, partially in the OS 212 if the OS 212 supports memory hot-plugging, a logical layer between the hardware layer 202 and the OS 204, OS 212, or a combination of these. For example, the context switching engine 208 can include a driver in the kernel of the OS 204, triggered by a switch instruction from a context-switching application. (The context-switching application can be considered "part of" the context switching engine 208 in the sense that actions taken by the context-switching application can be described in this paper as actions taken by the context switching engine 208.) The context switching engine 208 can use virtualization features of a processor, such as VMexit to exit into a hypervisor and VMenter to enter a virtual machine. Alternatively, OS code could be rewritten to call a new context without these virtualization features, though this technique would still call for a logical separation of the OS from the hardware. The context switching engine 208 can use power management features of an OS, such as advanced configuration and power interface (ACPI) sleep functionality. The Advanced Configuration and Power Interface Specification Revision 4.0, Jun. 16, 2009, is incorporated by reference. In an implementation, the context switching engine 208 can trigger the sleep function of an OS, but intercept a final write to the OS. So the sleep functionality can properly be characterized as part of the OS or logically as part of the context switching engine 208 even though some implementations may simply have the context switching engine 208 trigger the sleep functionality and intercept a final write, but rely upon the OS to carry out the sleep. A final write can include, for example, one or more writes to a power management block, which could be implemented using an fixed ACPI description table (FADT) power management 1 (PM1). (PM1 refers to power management associated with sleep.) Normally, the final write would power down hardware after stopping processes, I/O, and application processors, leaving a single processor executing. (In the ACPI example, the OS would set the sleep type and enable bits in the FADT PM1 control register.) However, since the context switching engine 208 intercepts the final write, the context switching engine 208 can instead trigger a boot loader. The context switching engine 208 can be referred to as creating or inserting a context switching layer between the hardware layer 202 and the OS 204.

In the example of FIG. 2, the OS data store 210 is coupled to the context switching engine 208. The OS data store 210 can be implemented as one or more flat files, databases, and/or other data structures embodied in a computer-readable medium. In operation, the OS data store 210 includes data associated with the OS 204 and the OS 212, including OS state. The data should include sufficient information to enable the context switching engine 208 to restore an OS to an initial or previous state. For example, system state that is in memory can remain in memory (which would mean that the OS data store 210 includes at least part of system memory) or it can be stored to disk to save memory resources, or some combination such as leaving the system state in memory until memory resources are needed, at which point the system state could be saved to disk and the memory locations reused. As another example, power state, such as ACPI FADT/firmware ACPI control structure (FACS) state, could be stored in registers. Since the context switching engine 208 switches from the OS 204 to the OS 212, it would be desirable to save the power state elsewhere. Normally when a system goes to sleep, the data in the registers does not have to be saved elsewhere because it is assumed that when the system wakes up again it will be in the same OS. So typical OS sleep functionality does not include saving power state. However, when the system 200 "wakes up," it will have switched from the OS 204 to the OS 212, necessitating saving the data in the registers to some other location due to the fact that the OS 212 will overwrite the values in the registers. Depending upon the implementation, the OS data store 210 could include data for each OS in a similar format, in the same data structure, in different formats/data structures depending upon whether the state is an initial state or a previous state, whether the state is system state or power state, etc. When, where, and how data is stored is not critical so long as the OS data store 210 enables the context switching engine 208 to perform its switching function.

In the example of FIG. 2, in operation, only one of the OS 204 and the OS 212 is active at a time. Therefore, advantageously, neither the OS 204 nor the OS 212 are treated as a "guest" OS, regardless of which OS is booted at startup. Moreover, there is no need for a "thick" hypervisor or virtual machine monitor to persistently sit between the OS 204, 212 and the hardware layer 202. Rather, the context switching engine 208 can insert a context switching layer only as needed (presumably as late as possible to maximize performance). Alternatively, the context switching engine 208 could create a context switching layer that is designed to facilitate optimal performance by allowing the OS to run "on bare metal" as much as possible. The context switching layer can be implemented, for example, as a "minimalist" hypervisor that is limited in time (with a goal of minimum amount of time) between the OS and the hardware or limited in the amount of separation between the OS and hardware layers (with a goal of minimum amount of separation). For example, conceptually, the context switching engine 208 virtualizes only those elements of the hardware that are needed to accomplish context switching and/or only puts those elements in place when they are needed.

In the example of FIG. 2, in operation, the context switching engine 208 can receive a switch instruction as input. The switch instruction tells the context switching engine 208 to switch from the OS 204 to the OS 212. The switch instruction can be provided in a number of different ways. For example, a user could trigger the switch instruction by launching a context-switching application that triggers the switch instruction, the OS 204 (or the OS 212) could decide when to trigger the switch instruction, or the switch instruction could be provided in response to some other stimulus.

In the example of FIG. 2, in operation, the context switching engine 208 inserts a context switching layer between the hardware layer 202 and the OS 204. (The context switching layer is considered "part of" the context switching engine 208 in the sense that actions taken at the context switching layer can be described in this paper as actions taken by the context switching engine 208.) To accomplish this task, the context switching engine 208 is capable of allocating memory for the context switching layer and loading it. For example, a context-switching application could trigger a kernel driver to insert a context switching layer between the hardware layer 202 and the OS 204, and set up the context switching layer to catch accesses to the OS address space. In an embodiment, the context switching layer is inserted in response to the switch instruction. Alternatively, the context switching layer could be inserted prior to receiving the switch instruction as a thin but persistent layer.

In the example of FIG. 2, for illustrative purposes, the OS 204 is initially active when the context switching engine 208 receives the switch instruction. The context switching engine 208 allocates memory to load the OS 212 and relevant OS state, data for which can be obtained from the OS data store 210. To accomplish this task, the context switching engine 208 is capable of allocating memory for a next OS (the OS 212 in this example) and the state associated with the next OS, and loading it. The context switching engine 208 can also arrange memory contents to put the OS 212 in a place where it can be booted. For example, the context switching engine 208 (in an embodiment, a kernel driver) can allocate memory for an OS image associated with the OS 212, and load the image in preparation for boot. In an embodiment, the memory is allocated in response to the switch instruction.

In the example of FIG. 2, in operation, the context switching engine 208 puts the OS 204 to sleep. Sleep is usually fast because it often does not involve storing state to disk. Sleep under normal circumstances will shut down all drivers, and keep all state in memory, power down most peripherals and then power down the main CPU, while maintaining power to memory. To accomplish this task, the context switching engine 208 can instruct the OS to sleep which, for example, can cause the OS to freeze all processes, stop device I/O, leave system state in memory, freeze application processors, and leave only a single processor running; then write to a power management block that is part of the hardware and cause the system to power down. If the system 200 is ACPI-compliant, the OS 204 may have a FADT PM1 to which the command is written. In this example, the OS 204 then sets the sleep type and the sleep enable bits in the FADT PM1 control register. Advantageously, the OS 204 need not know about the context switching and can use functionality that is present in most modern OSs to put itself to sleep.

In the example of FIG. 2, in operation, the context switching engine 208 saves the state of the OS 204 (and perhaps other data associated with the OS 204) in the OS data store 210. It is expected that the context switching engine 208 will save the state in response to the switch instruction, though it is also possible that state could be saved continuously or occasionally.

In an embodiment, the context switching engine 208 tells the OS 204 to go to sleep, the OS 204 will begin to put itself to sleep, data associated with the OS 204, such as system state, is saved, then the context switching engine 208 can catch instructions right before the OS 204 goes to sleep and perform context switching instead. To accomplish this task, the context switching engine 208 can catch a final write to the FADT PM1 control register at the context switching layer, but instead of powering down the system, trigger a boot loader.

In the example of FIG. 2, the context switching engine 208 sets up the machine for booting the OS 212. The context switching engine 208 can, for example, trigger a boot loader to disable interrupts, disable paging or remap memory, save the power state for the OS 204, swap the contents in low memory (0 to N Mbytes) and the OS 212 memory contents, restore or set the power state for the OS 212, and setup the machine for booting the OS 212. (The boot loader can be considered "part of" the context switching engine 208.) The power state can include, for example, ACPI FADT/FACS state. The power state may represent the contents of registers that are normally left in place when an OS goes to sleep, but which must be saved elsewhere if the system switches to a different OS.

In the example of FIG. 2, in operation, the OS 212 is then booted from memory. To accomplish this task, the context switching engine 208 (specifically, the boot loader) can jump to the next OS in memory, which is the OS 212 in this example, to start it. Start up includes initializing hardware devices the OS 212 needs to operate, and saving any state necessary from the previous OS, which is the OS 204 in this example, so that the previous OS can be restarted later, if applicable. Advantageously, using this technique, the OS 212 can be booted without using the entire boot firmware, such as BIOS, EFI, or other code. So context switching is relatively fast; booting an OS without using the entire boot firmware can be referred to as fast context switching.

In the example of FIG. 2, at this point in operation, the OS 212 is fully operational and can access the hardware layer 202 directly at full performance. State from the OS 204 may or may not be maintained in memory. For example, it may be desirable to implement a system that leaves OS 204 state in memory, unless the memory resources need to be recycled. If the OS 212 needs more memory and there are no unused areas, the OS 212 could write out memory areas from the sleeping OS 204 to disk, and free up those areas for use. Alternatively, it may be desirable to implement a system in which the context switching engine stores system state to the OS data store 210 and recycles memory resources as a matter of course. As another example, power state might be saved to the OS data store 210 by the context switching engine in case of switch back to the OS 204.

To restore the OS 204, the process described above for switching from the OS 204 to the OS 212 is reversed. For example, the context switching engine 208 shuts down applications and services, frees up pages, restores state from disk, inserts a context switching layer under the OS 212, shuts down drivers managing hardware; the context switching layer catches accesses to a power management block that would normally cause power down; and the context switching engine 208 restores memory areas that were moved away to allow the OS 212 to run and executes the resume from sleep entry point that will cause the OS 204 to run again. In this way, the OS 204 and driver, application, and power state is restored as before a context-switching application was launched to trigger the switch from the OS 204 to the OS 212.

The system 200 is described as allowing fast context switching midstream while the OS 204 is active. However, using this technique, an alternative boot loader could be implemented to change the boot firmware so as to avoid a full reboot and start with any desired OS. In this way, the default OS can be any OS that is designated by the alternative boot loader, and the system 200 can start up in the default OS. Thus, it is possible to accomplish context switching that spans a restart (or spans power down to startup) following an adjustment to the alternative boot loader in a previous session.

Figure 3:
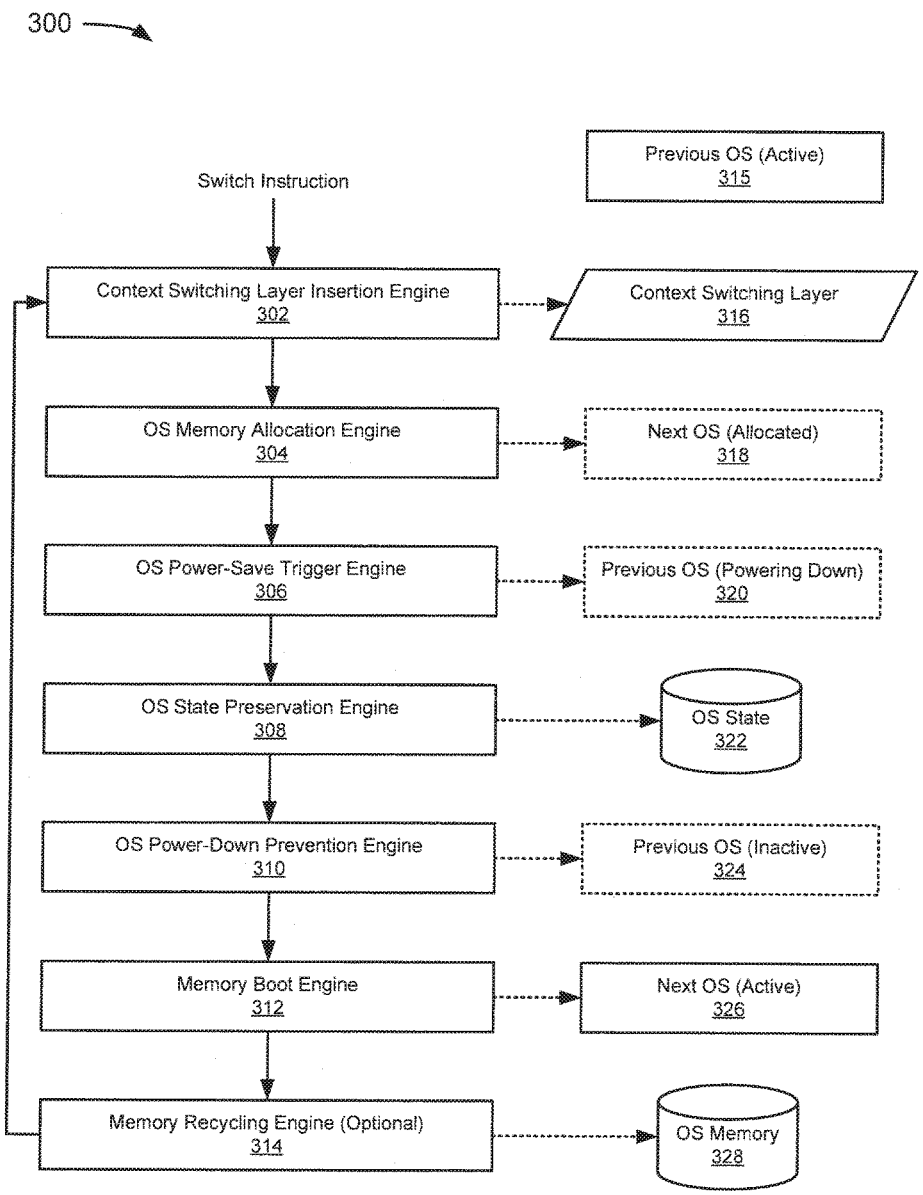
FIG. 3 depicts an example of an OS switching system.

FIG. 3 depicts an example of an OS switching system 300. The system 300 includes a context switching layer insertion engine 302, an OS memory allocation engine 304, an OS power-save trigger engine 306, an OS state preservation engine 308, an OS power-down prevention engine 310, a memory boot engine 312, and an optional memory recycling engine 314. In the example of FIG. 3, initially, a first ("previous") OS is active, as illustrated by the box 315.

In the example of FIG. 3, the context switching layer insertion engine 302 receives a switch instruction and creates a context switching layer 316 for insertion between the first OS and a hardware layer (not shown). By separating the hardware from the OS, the context switching layer 316 can introduce additional functionality while the OS and the hardware can operate without recoding or redesign. The context switching layer 316 can be used to facilitate fast switching from one OS to another; so the context switching layer 316 can be minimalist in the sense that it is inserted only when needed and/or only to the extent it is need to facilitate switching of OSs. The context switching layer 316 can include, for example, a minimalist hypervisor.

When data (including, e.g., control signals) pass from the OS to the hardware or vice versa, the data passes through the context switching layer. The context switching layer can also generate signals "as if" coming from the OS or the hardware, and can intercept signals to prevent them from passing from the OS to the hardware or vice versa. For example, the context switching layer could trigger an OS to go to sleep, allow the OS to carry out the process, but intercept a final write from the OS to the hardware (specifically, a control register) to, e.g., set sleep type and/or sleep enable bits. The context switching layer can also be given other functionality, such as an I/O driver to enable the saving of state or other data to a storage device, though in at least one implementation the context switching layer has no drivers (in such an implementation, to the extent drivers are needed, they are utilized through an OS).

In the example of FIG. 3, the OS memory allocation engine 304 allocates memory for a second ("next") OS, as illustrated by the box 318. The OS memory allocation engine 304 loads data associated with the second OS into memory. The memory allocation and loading of data associated with the second OS does not, in and of itself, cause the system to reboot with the second OS. Typically, OS data is in low memory (currently occupied by the first OS). If the second OS data was simply loaded into low memory while the first OS was running, it would probably cause a system crash, if it could be done at all. For this reason, the data associated with the second OS is loaded into memory with the intention of rearranging the memory contents such that the second OS can take over from the first OS without causing a system crash and without the need to shut down the system and reboot with the second OS.

In the example of FIG. 3, the OS power-save trigger engine 306 causes the first OS to initiate power-save (e.g., sleep) procedures, as illustrated by the box 320. Most modern OSs and hardware enable entering a power-save mode, such as sleep. So the OS power-save trigger engine 306 can potentially only need to trigger sleep procedures that are already available through an OS. If the OS did not have sleep capabilities, but was implemented on hardware capable of entering sleep or another known or convenient power-save or power-down state, the OS power-save trigger engine 306 could include additional functionality that would cause the hardware to begin to power down. In this paper, a power-save mode is intended to mean a sleep mode, which is one example of a power-save mode, or any applicable known or convenient power-save mode. Since power-save modes cause a system to reduce its power, the system can be said to be "powering down" when it initiates entry into a power-save mode, even if ultimately the system does not power down completely.

In the example of FIG. 3, the OS state preservation engine 308 stores state information associated with the first OS in an OS state data store 322. The OS state in the OS state data store 322 can include system state, power state, and other state associated with inactive OSs. It may be the case that the OS state preservation engine 308 stores different state at different times. For example, the OS state preservation engine 308 might store system state after the OS power-save trigger engine 306 causes the first OS to begin a power-save procedure, but might store power state after the OS power-down prevention engine 310 prevents the system from completing entry into the power save mode.

In the example of FIG. 3, the OS power-down prevention engine 310 prevents the first OS from completing entry into a power save mode. The first OS will be inactive, as illustrated by the box 324, but the system 300 will not power down. For example, the OS power-down prevention engine 310 can capture a final write to a power management block associate with the first OS to prevent the first OS from completing the final step or steps of a power-save process. In this way, the first OS can be deactivated, but the system will not power down completely, enabling the system to reboot from memory.

In the example of FIG. 3, the memory boot engine 312 boots the second OS from memory, which activates the second OS, as illustrated by the box 326. The memory boot engine 312, as its name suggests, performs many of the functions expected of a boot loader, such as disabling interrupts, disabling paging or remap memory, and setting up the machine for booting an OS. In addition, the memory boot engine 312 can save power state (this functionality can also or instead be attributed to the OS state preservation engine 308), swap contents in low memory with memory contents that are associated with the second OS, and set or restore the power state for the second OS. The memory boot engine 312 can then branch to the appropriate memory location to run the second OS.

Since state associated with the first OS may remain in hardware registers, a boot loader of the memory boot engine 312 can save the state. In this paper, the OS state preservation engine 308, depending upon context, can be treated as if it includes all functionality associated with saving state, even if some of the functionality is logically within the boot loader triggered by the memory boot engine 312. This is because the OS state preservation engine 308 conceptually includes all aspects of state preservation, even if state is saved in different manners, at different times, or by different processes or processors.

As used in this paper, booting from memory at least includes allocating memory for a second OS (using, e.g., the OS memory allocation engine 304), loading data associated with the second OS in the allocated memory (using, e.g., the OS memory allocation engine 304), and branching to a relevant memory location to run the second OS (using, e.g., the memory boot engine 312). Depending upon the implementation, a memory boot process can also require swapping contents in low memory with the allocated memory contents and setting power state for the second OS.

In the example of FIG. 3, the memory recycling engine 314 reuses memory that was allocated to the first OS and stores the contents of memory in an OS memory data store 328. The memory recycling engine 314 (or at least operation of the memory recycling engine 314) is optional because a system may have sufficient resources to keep the first OS in memory.

In the example of FIG. 3, while the second OS is running, the context switching layer insertion engine 302 awaits a next switch instruction. When the next switch instruction is received, the second OS is now the "previous" OS and the first OS or some other OS is now the "next" OS.

Figure 4:
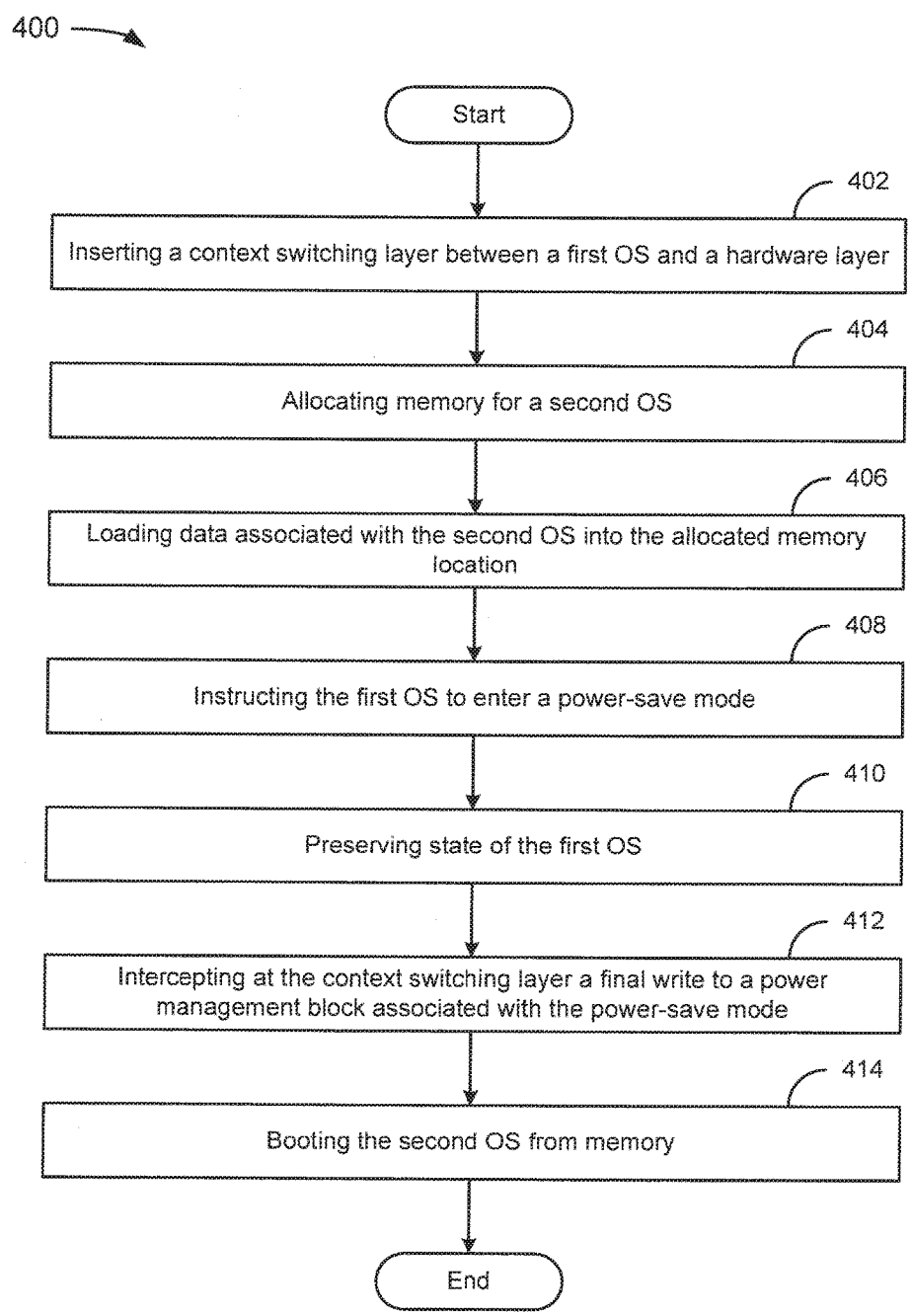
FIG. 4 depicts a flowchart of an example of a method for fast context switching.

FIG. 4 depicts a flowchart 400 of an example of a method for fast context switching. The flowchart 400 is organized as a sequence of modules. However, it should be understood that these, and modules associated with other methods described herein, may be reordered into different sequences of modules or for parallel execution.

In the example of FIG. 4, the flowchart 400 continues at module 402 with inserting a context switching layer between a first operating system (OS) and a hardware layer. The context switching layer can be created, for example, using virtualization features of a processor. The context switching layer can include, for example, a minimalist hypervisor.

In the example of FIG. 4, the flowchart 400 starts at module 404 with allocating memory for a second OS. In a specific implementation, the allocated memory does not initially include memory locations that are used by the first OS, such as, for example, low memory.

In the example of FIG. 4, the flowchart 400 continues at module 406 with loading data associated with the second OS into the allocated memory location. The data can include, for example, an initial system state for the second OS, or can be loaded from an OS data store that includes system state associated with the second OS from when it was previously running on the system.

In the example of FIG. 4, the flowchart 400 continues at module 408 with instructing the first OS to enter a power-save mode. The power-save mode can include, for example, a sleep mode. Although the first OS is instructed to enter the power-save mode, unless the OS is configured to know that the intention is to switch from the first OS to the second OS, the first OS will not necessarily succeed in completely entering the power save mode.

In the example of FIG. 4, the flowchart 400 continues at module 410 with preserving state of the first OS. In a specific implementation, state can be preserved as the first OS carries out powering down in accordance with entering a power-save mode. For example, the first OS can freeze processes and stop device I/O, while leaving system state in memory (e.g., low memory). The first OS can also freeze application processors while leaving a single processor running. Some state, such as power state, might be preserved later. Saving power state later might be necessary because power-save functionality normally preserves power state by leaving the contents of control registers alone, and then using the values in the control registers when the system comes out of power-save mode. However, since it is the intention in this method to switch from the first OS to the second OS, the first OS will lose the power state when the control registers are overwritten with the power state of the second OS. For this reason, the power state can be saved after the power-save mode is (nearly) completed following interception of a final write to a power management block.

In the example of FIG. 4, the flowchart 400 continues at module 412 with intercepting at the context switching layer a final write to a power management block associated with the power-save mode. In an implementation that allows an OS to perform all of the steps associated with a power-save procedure, then capturing only a final write, it is possible to insert the context switching layer between the OS and the hardware without actually modifying the OS. Thus, the OS can be "agnostic" regarding whether there is context switching. It may be desirable to capture power state of the first OS after a final write is intercepted so that resources (e.g., control registers) can be overwritten when the second OS takes over. By capturing the power state of the first OS, the system can switch back to the first OS at a later time and overwrite the contents of, e.g., the control registers.

ACPI specifies an interface of registers. Power state can be referred to as "ACPI state" for ACPI standards-compliant systems. For an OS that goes to sleep, the ACPI power state normally is not changed from the time the OS goes to sleep to the time it awakens again. Guest OSs would see a fake ACPI state (generally, a complete software emulation of the ACPI state), which means they would not overwrite ACPI state of a master OS. However, context switching would destroy ACPI state. Advantageously, the ACPI state of the first OS can be identified and saved so that the system can switch back to the first OS even though the second OS overwrites the ACPI state.

In the example of FIG. 4, the flowchart 400 continues at module 414 with booting the second OS from memory. As has been stated, state of the first OS can be saved at different times. A boot loader may disable interrupts and paging or remap memory. Prior to disabling interrupts and paging or remap memory, it may or may not be difficult to save power state. So, in at least one implementation, the power state is saved only after interrupts and paging or remap memory are disabled. Other tasks that can occur after the disabling of interrupts and paging or remap memory are swapping data associated with the first OS with data associated with the second OS. In at least one implementation, OS data is in low memory. So in order to run the second OS the contents of low memory must be moved elsewhere (e.g., by swapping the contents of low memory with the contents of the allocated memory, storing the contents of low memory to disk, or moving the contents of low memory to some other location), and the contents of the allocated memory associated with the second OS must be moved to low memory (e.g., by swapping the contents of low memory with the contents of the allocated memory or overwriting the contents of the low memory with the contents of the allocated memory). In an implementation that does not require the use of low memory, it is still likely, but not a requirement, that at least some memory is reserved for use by an OS. Also, it may or may not be required that the specific memory locations used by the first OS be replaced with data associated with the second OS. Regardless of the implementation-specific details, some arrangement of memory will be carried out so as to put the data associated with the second OS in a place that the system expects when the second OS is running. It is theoretically possible that the arrangement is as simple as changing the pointer from pointing to a location associated with the first OS to a location associated with the second OS, though this is unlikely to be effective using computer systems that are on the market today, which require that the OS occupy expected memory locations.

Figure 5:
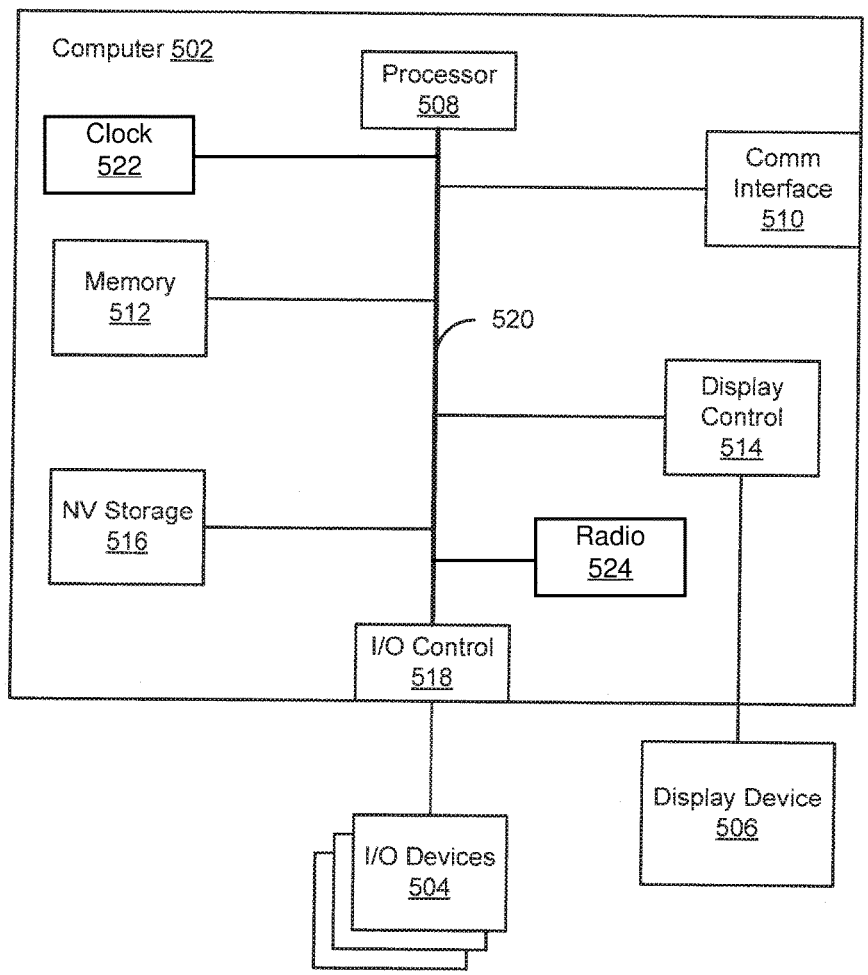
FIG. 5 depicts an example of a computer system.

FIG. 5 depicts an example of a computer system 500. The system 500 may be a conventional computer system that can be used as a client computer system, such as a wireless client or a workstation, or a server computer system. The system 500 includes a computer 502, I/O devices 504, and a display device 506. The computer 502 includes a processor 508, a communications interface 510, memory 512, display controller 514, non-volatile storage 516, I/O controller 518, clock 522, and radio 524. The computer 502 may be coupled to or include the I/O devices 504 and the display device 506.

The computer 502 interfaces to external systems through the communications interface 510, which may include a modem or network interface. It will be appreciated that the communications interface 510 can be considered to be part of the system 500 or a part of the computer 502. The communications interface 510 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 508 may be, for example, a conventional microprocessor such as an Intel Pentium microprocessor or Motorola power PC microprocessor. The memory 512 is coupled to the processor 508 by a bus 520. The memory 512 can be Dynamic Random Access Memory (DRAM) and can also include Static RAM (SRAM). The bus 520 couples the processor 508 to the memory 512, also to the non-volatile storage 516, to the display controller 514, and to the I/O controller 518.

The I/O devices 504 can include a keyboard, disk drives, printers, a scanner, and other input and output devices, including a mouse or other pointing device. The display controller 514 may control in the conventional manner a display on the display device 506, which can be, for example, a cathode ray tube (CRT) or liquid crystal display (LCD). The display controller 514 and the I/O controller 518 can be implemented with conventional well known technology.

The non-volatile storage 516 is often a magnetic hard disk, flash memory, an optical disk, or another form of storage for large amounts of data. Some of this data is often written, by a direct memory access process, into memory 512 during execution of software in the computer 502. One of skill in the art will immediately recognize that the terms "machine-readable medium" or "computer-readable medium" includes any type of storage device that is accessible by the processor 508.

Clock 522 can be any kind of oscillating circuit creating an electrical signal with a precise frequency. In a non-limiting example, clock 522 could be a crystal oscillator using the mechanical resonance of vibrating crystal to generate the electrical signal.

The radio 524 can include any combination of electronic components, for example, transistors, resistors and capacitors. The radio is operable to transmit and/or receive signals.

The system 500 is one example of many possible computer systems which have different architectures. For example, personal computers based on an Intel microprocessor often have multiple buses, one of which can be an I/O bus for the peripherals and one that directly connects the processor 508 and the memory 512 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 512 for execution by the processor 508. A Web TV system, which is known in the art, is also considered to be a computer system, but it may lack some of the features shown in FIG. 5, such as certain input or output devices. A typical computer system will usually include at least a processor, memory, and a bus coupling the memory to the processor.

In addition, the system 500 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 516 and causes the processor 508 to execute the various acts required by the operating system to input and output data and to store data in memory, including storing files on the non-volatile storage 516.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, understood to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

The invention claimed is:

1. A system comprising:
a hardware layer comprising hardware;
a context switching layer insertion engine;
an operating system (OS) memory allocation engine coupled to the context switching layer insertion engine;
an OS state preservation engine including a processor, the OS state preservation engine coupled to the context switching layer insertion engine;
a memory boot engine including a processor, the memory boot engine coupled to the context switching layer insertion engine;
wherein, in operation:
the OS memory allocation engine allocates first dynamic memory for a first OS and loads first data associated with the first OS into the first dynamic memory, and allocates second dynamic memory for a second OS and loads second data associated with the second OS into the second dynamic memory;
the context switching layer insertion engine receives a switch instruction to switch from the first OS to the second OS, creates, in response to the switch instruction and after the OS memory allocation engine allocates the first dynamic memory and the second dynamic memory, a context switching layer having direct access to the hardware in the hardware layer, and inserts the context switching layer between the first OS and the hardware layer;
the memory boot engine transfers to the second OS the direct access to the hardware, and loads, in response to the switch instruction, the second OS from the second dynamic memory without invoking one or more boot sequences of the second OS.

2. The system of claim 1, wherein the direct access comprises performing a read operation or write operation without use of virtualization.

3. The system of claim 1, wherein the context switching layer comprises a minimalist hypervisor.

4. The system of claim 1, wherein the switch instruction is based on a control signal from the first OS or the second OS, and the hardware layer.

5. The system of claim 1, wherein the context switching layer insertion engine is configured to:
receive a first signal from the first OS or the second OS;

provide a second signal to the hardware layer, the second signal appearing to the hardware layer as if the second signal was coming from the first OS or the second OS.

6. The system of claim 5, wherein the first signal comprises a request for hardware resources from the hardware layer.

7. The system of claim 1, wherein the context switching layer insertion engine is configured to:
receive an indication from the first OS that the first OS is to go to sleep;
intercept a write request from the first OS to the hardware layer;
set, in the hardware layer, a sleep type or sleep enable bits associated with the first OS.

8. The system of claim 7, wherein the write request comprises one or more requests to a power management block of the hardware layer.

9. The system of claim 1, wherein the context switching layer comprises an input/output (I/O) driver configured to enable saving a state of the first OS to a datastore.

10. The system of claim 1, wherein, in operation:
the context switching layer insertion engine inserts another context switching layer between the second OS and the hardware layer;
the OS memory allocation engine allocates third dynamic memory for the first OS and loads data associated with the first OS into the third dynamic memory;
the memory boot engine boots the first OS from the third dynamic memory, thereby restoring the first OS.

11. A method comprising:
allocating first dynamic memory for a first OS;
loading first data associated with the first OS into the first dynamic memory;
allocating second dynamic memory for a second OS;
loading second data associated with the second OS into the second dynamic memory;
receiving a switch instruction to switch from the first OS to the second OS;
creating in response to the switch instruction, and after allocating the first dynamic memory and allocating the second dynamic memory, a context switching layer having direct access to the hardware in the hardware layer;
inserting the context switching layer between the first OS and the hardware layer;
transferring to the second OS the direct access to the hardware;
loading, in response to the switch instruction, the second OS from the second dynamic memory without invoking one or more boot sequences of the second OS.

12. The method of claim 11, wherein the direct access comprises performing a read operation or write operation without use of virtualization.

13. The method of claim 11, wherein the context switching layer comprises a minimalist hypervisor.

14. The method of claim 11, wherein the switch instruction is based on a control signal from the first OS or the second OS, and the hardware layer.

15. The method of claim 11, further comprising:
receiving a first signal from the first OS or the second OS;
providing a second signal to the hardware layer, the second signal appearing to the hardware layer as if the second signal was coming from the first OS or the second OS.

16. The method of claim 15, wherein the first signal comprises a request for hardware resources from the hardware layer.

17. The method of claim 11, further comprising:
receiving an indication from the first OS that the first OS is to go to sleep;
intercepting a write request from the first OS to the hardware layer;
setting, in the hardware layer, a sleep type or sleep enable bits associated with the first OS.

18. The method of claim 17, wherein the write request comprises one or more requests to a power management block of the hardware layer.

19. The method of claim 11, wherein the context switching layer comprises an input/output (I/O) driver configured to enable saving a state of the first OS to a datastore.

20. The method of claim 11, further comprising:
inserting another context switching layer between the second OS and the hardware layer;
allocating third dynamic memory for the first OS and loading data associated with the first OS into the third dynamic memory;
booting the first OS from the third dynamic memory, thereby restoring the first OS.

21. A system comprising:
means for allocating first dynamic memory for a first OS;
means for loading first data associated with the first OS into the first dynamic memory;
means for allocating second dynamic memory for a second OS;
means for loading second data associated with the second OS into the second dynamic memory;
means for receiving a switch instruction to switch from the first OS to the second OS;
means for creating in response to the switch instruction, and after allocating the first dynamic memory and allocating the second dynamic memory, a context switching layer having direct access to the hardware in the hardware layer;
means for inserting the context switching layer between the first OS and the hardware layer;
means for transferring to the second OS the direct access to the hardware;
means for loading, in response to the switch instruction, the second OS from the second dynamic memory without invoking one or more boot sequences of the second OS.

* * * * *